United States Patent [19]

Liu et al.

[11] Patent Number: 4,596,075
[45] Date of Patent: Jun. 24, 1986

[54] VERNIER GAUGE

[76] Inventors: Bau-Shen Liu; Bau-Horng Liu, both of Taipei, Taiwan

[21] Appl. No.: 722,277

[22] Filed: Apr. 11, 1985

Related U.S. Application Data

[63] Continuation-in-part of Ser. No. 544,467, Oct. 24, 1983.

[51] Int. Cl.⁴ ............................ G01B 3/38; G01B 3/56
[52] U.S. Cl. ......................................... 33/403; 33/531; 33/532; 33/143 R
[58] Field of Search ................. 33/403, 143 R, 149 R, 33/531, 532

[56] References Cited

U.S. PATENT DOCUMENTS

| | | | |
|---|---|---|---|
| 3,252,223 | 5/1966 | Gettel | 33/403 |
| 3,453,738 | 7/1969 | Lipski, Sr. et al. | 33/403 |
| 3,579,841 | 5/1971 | Peterson | 33/403 |

FOREIGN PATENT DOCUMENTS 1078138  11/1954  France ................................. 33/471

*Primary Examiner*—Willis Little
*Attorney, Agent, or Firm*—McCormick, Paulding & Huber

[57] ABSTRACT

A vernier gauge includes a first arc member having a first radially inner side and a first radially outer side, a second arc member having a second radially inner side and a second radially outer side slidably engaged with the first radially inner side, having a second free end and a second clamped end and provided with a second scale, a third arc member having a third radially inner side slidably engaged with the first outer side and a third radially outer side, having a third free end and a third clamped end and provided with a third scale, the third arc member together with the first and second arc members defining a free space at the center of the first, second and third arc members, two intermediates each of which has a first end provided on one of the second and third free ends and a second end and is capable of moving radially with respect to the arc members and two measuring pieces each of which has a first engaging end pivotally connected to the second end and a second engaging end pivotally interconnected with each other so that with the two measuring pieces contacting with two sides of an object to be measured, the angle stretched by the two sides can be read from the second and third scales.

15 Claims, 23 Drawing Figures

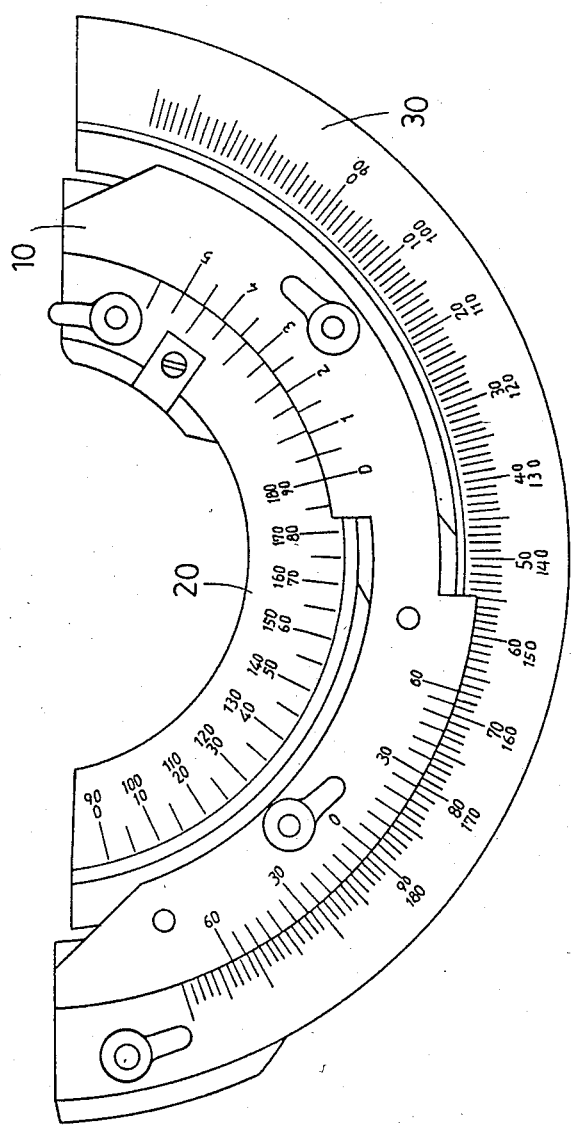
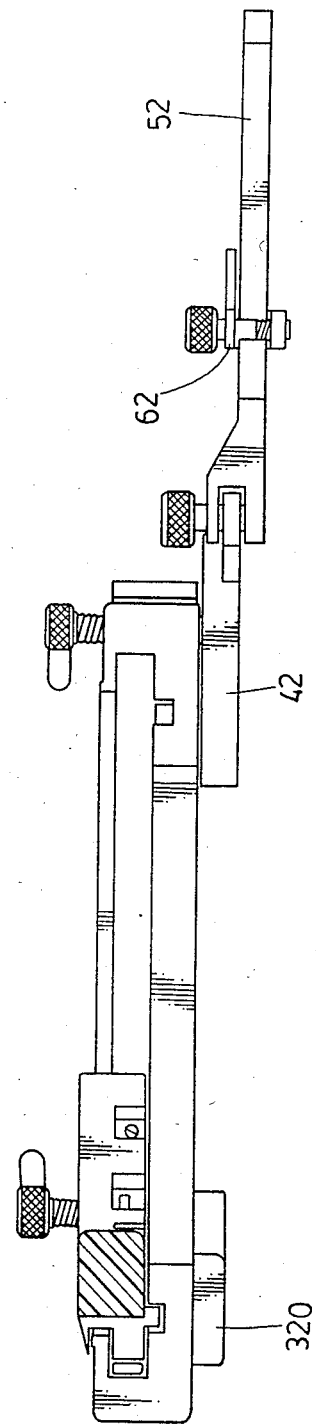
FIG. 8A
FIG. 8B

VERNIER GAUGE

CROSS-REFERENCE TO RELATED APPLICATION

This application is a continuation-in-part of allowed U.S. Ser. No. 544,467, filed Oct. 24, 1983.

BACKGROUND OF THE INVENTION

The present invention relates to a vernier gauge, and more particularly to a vernier gauge having arc members in concentric movement.

Presently, in measuring the taper of a tapered bore, two coaxial truncate cones having different diameters are fitted in the tapered bore to obtain the taper by dividing the diameter difference of the two truncate cones by the axial difference therebetween. Such a method for obtaining the taper suffers from the disadvantage that a different tapered bore will demand two different truncate cones. It is therefore attempted by the applicant to deal with that disadvantage by diversifying the arc members in the parent application.

SUMMARY OF THE INVENTION

It is therefore an object of the present invention to provide a vernier gauge which is capable of measuring the taper of any tapered bore.

According to the present invention, a vernier gauge includes a first arc member having a first radially inner side and a first radially outer side, a second arc member having a second radially inner side and a second radially outer side slidably engaging with the first radially inner side, having a second free end and a second clamped end and provided with a second scale, a third arc member having a third radially inner side slidably engaging with the first outer side and a third radially outer side, having a third free end and a third clamped end and provided with a third scale, the third arc member together with the first and second arc members defining a free space at the center of the first, second and third arc members, two intermediates each of which has a first end provided on one of the second and third free ends and a second end is capable of moving radially with respect to the arc members and two measuring pieces each of which has a first engaging end pivotally connected to the second end and a second engaging end pivotally interconnected with each other so that with the two measuring pieces contacting with two sides of an object to be measured, the angle stretched by the two sides can be read from the second and third scales.

Certainly, the measuring pieces can be straight and each can have the outer side thereof shaped to simulate a knife edge for improving the accuracy in measuring.

Alternatively, each measuring piece can include a first portion having a first end connected and perpendicular to the second end of the first portion and a second end, a second portion having a first end connected and perpendicular to the second end of the first portion and a second end, a third portion having a first end connected and perpendicular to the second end of the second portion at a side on the second portion opposite to that where the first portion is connected and perpendicular to the first end of the second portion and a second end and a fourth portion having a first end connected and perpendicular to the second end of the third portion and a second end forming thereon the second engaging end which positions at the extension of the centerline of the first portion. Also, each measuring piece can have the outer side thereof shaped to simulate a knife edge for improving accuracy in measuring.

Preferably the present vernier gauge can further include two positioning pieces each of which is capable of sliding along the third portions of the straight measuring pieces so that when the measuring pieces are fitted in a tapered bore, the positioning pieces will respectively mark two points on the third portions or the straight measuring pieces so that a diameter of the tapered bore can be obtained by measuring the distance between the two points.

Certainly, each of the positioning pieces can include a rectangular portion having a U-shaped cross section with the hollow portion thereof receiving therein the third portion or the straight measuring piece for sliding thereon and a triangular portion extended from one side of the rectangular portion and having a triangular shape with the outer side thereof shaped to simulate a knife edge.

Preferably the present gauge further includes two slip pieces respectively provided between the first and second arc members as well as the first and third arc members, a screw threadedly engaging with the first arc member and a lever piece fitted in the first arc member and having a first end capable of engaging with one of the slip pieces and a second end capable of engaging with the screw so that when the screw is screwed on the first arc member to urge the second end of the lever piece, the first end of the lever piece will bias against the one slip piece to insure no possibility of relative movement between the two arc members provided with the one slip piece.

Certainly, the lever piece can be 7-shaped with the top portion thereof acting as the first end thereof and the lowest portion thereof acting as the second end thereof.

Preferably, the present gauge further includes two screws respectively threadedly engaging with the second and third free ends and wherein each of the intermediates is provided with a dovetailed groove, two first half dovetailed protrusions respectively integrally formed with the second and third free ends, each of the second and third free ends is provided with a hole adjacent to the first half dovetailed protrusion and capable of being protruded therein by one of the screws and two securing pieces each of which is received in the hole and has the lower end thereof formed thereon a second half dovetailed protrusion which together with one of the first half dovetailed protrusions are capable of constituting a whole dovetailed protrusion, each the securing piece and the first half dovetailed protrusion being capable of being inserted therebetween by the one screw which when screwed on one of the second and third free ends to a predetermined depth will ensure that the whole dovetailed protrusion securely engages with the dovetailed groove to insure no possibility of relative movement therebetween.

Certainly, the present gauge can further include two retaining pieces respectively fixed to the second and third free ends and to each of which the each securing piece is attached for being retained in the hole.

Certainly, the present gauge can further include two stoppers respectively provided on the upper surfaces of the second and third free ends for marking the final positions where the second and third arc members can respectively engage with the first arc member to prevent the disengagement between the arc members.

Certainly, the second end of each of the intermediates can be shaped triangularly and a protrusion can be provided on the vertex thereof for engaging with the first engaging end of each of the measuring pieces.

Certainly, the present gauge can further include two raising pieces respectively provided on the bottoms of the second and third clamped ends and having heights equal to those of the intermediates.

Certainly, the present gauge can further include two pushing pieces respectively provided on the bottoms of the second and third arc members near the second and third free ends for being reached by the fingers of a user's one hand to enable the user to operate the gauge with one hand only.

The present invention may best be understood with reference to the accompanying drawings, in which:

BRIEF DESCRIPTION OF THE DRAWING

FIG. 8A shows the top view of three arc members of a vernier gauge of the present invention; and FIG. 8B shows a side view of the first and third arc members with an intermediate, a measuring piece and a positioning piece of a vernier gauge of the present invention.

DETAILED DESCRIPTION OF THE PREFERRED EMBODIMENT

Figure 1A:
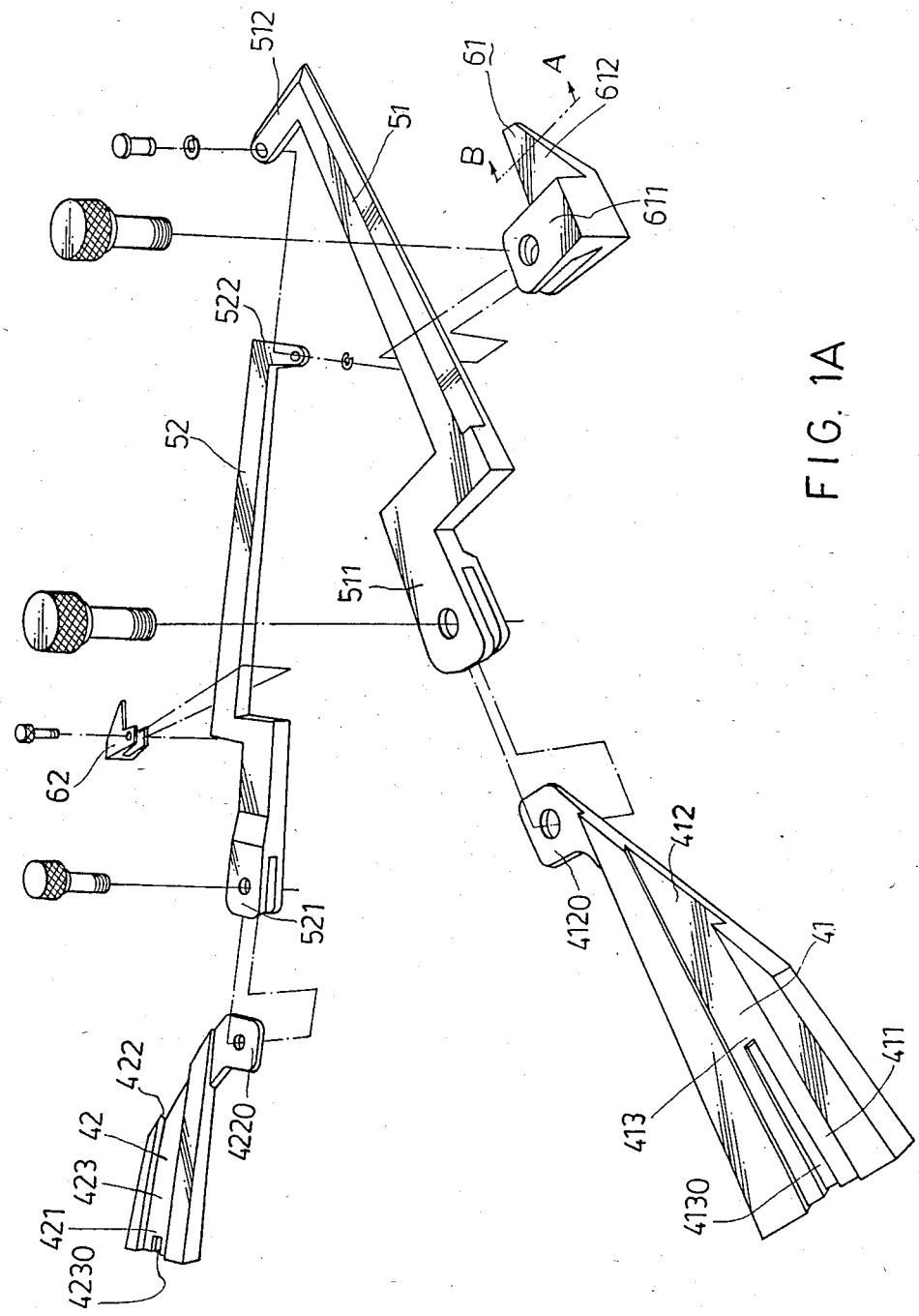
FIG. 1A is an exploded view showing two intermediates, two measuring pieces and two positioning pieces of a vernier gauge of the present invention.
Figure 2A:
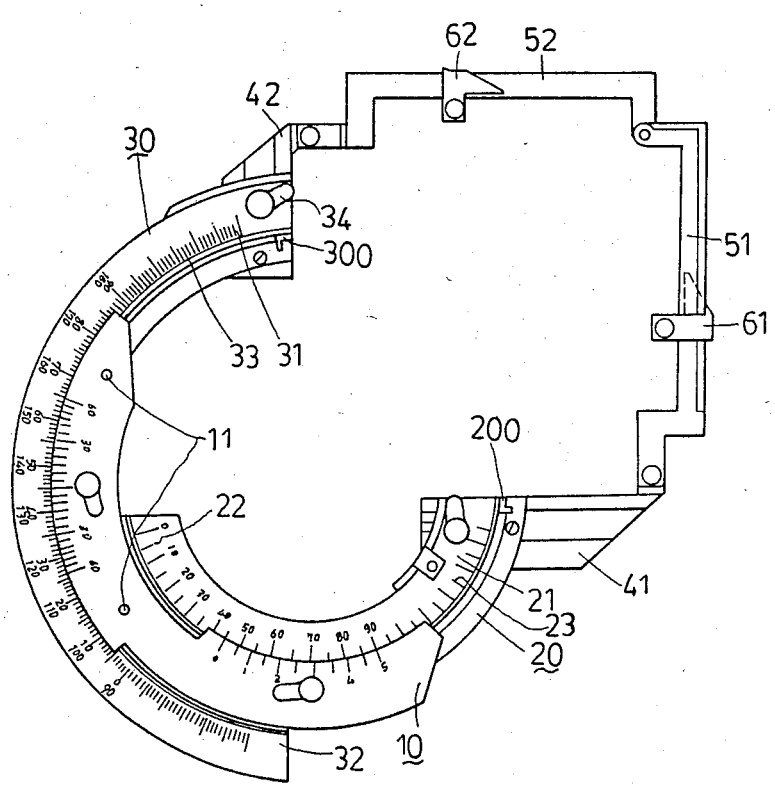
FIG. 2A is a top view showing a vernier gauge of the present invention.

Referring now to FIGS. 1A & 2A, a vernier gauge according to the present invention includes a first arc member 10, a second arc member 20, a third arc member 30, two intermediates 41, 42 and two measuring pieces 51, 52.

Figure 1B:
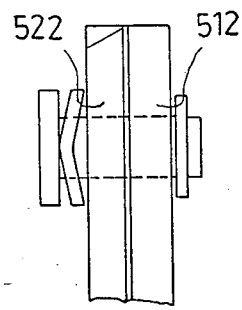
FIG. 1B is a schematic view showing the engagement between the two measuring pieces.

First arc member 10 has a first radially inner side and a first radially outer side. Second arc member 20 has a second radially inner side and a second radially outer side slidably engaging with the first radially inner side, has a second free end 21 and a second clamped end 22 and is provided with a second scale 23. Third arc member 30 has a third radially inner side slidably engaging with the first outer side and a third radially outer side, has a third free end 31 and a third clamped end 32 and is provided with a third scale 33. First, second and third arc members 10, 20 & 30 define a free space at the center thereof. Each of intermediates 41, 42 has a first end 411 (421) provided on second or third free end 21 (31) and a second end 412 (422) shaped triangularly to have a protrusion 4120 (4220) on the vertex thereon and is capable of moving radially with respect to arc members 10, 20 & 30. Each of measuring pieces 51, 52, which has a first engaging end 511 (521) pivotally connected to protrusion 4120 (4220) and a second engaging end 512 (522) pivotally interconnected with each other with a side view as shown in FIG. 1B, includes a first portion having a first end formed thereon first engaging end 511 (512) and a second end, a second portion having a first end connected and perpendicular to the second end of the first portion and a second end, a third portion having a first end connected and perpendicular to the second end of the second portion at a side on the second portion opposite to that where the first portion is connected and perpendicular to the first end of the second portion and a second end and a fourth portion having a first end connected and perpendicular to the second end of the third portion and a second end forming thereon second engaging end 512 (522) which positions at the extension of the centerline of the first portion.

Figure 1C:
FIG. 1C is a sectional view showing the second end of an intermediate of a vernier gauge of the present invention.

The above structure can further be equipped with two positioning pieces 51, 52. Each positioning piece 61 (62), which is capable of sliding along the third portion of measuring piece 51 (52) so that when measuring pieces 51, 52 are fit in a tapered bore, positioning pieces 61, 62 will respectively mark two points on the third portions so that a diameter of the tapered bore can be obtained by measuring the distance between the two points, includes a rectangular portion 611 having a U-shaped cross section with the hollow portion thereof receiving therein the third portion for sliding thereon and a triangular portion 612 extended from one side of rectangular portion 611 and having a triangular shape with the outer side thereof shaped to simulate a knife edge as shown in FIG. 1C.

Certainly, for improving the accuracy in measuring, the outer side of the third portions of measuring pieces 51, 52 can be shaped to simulate a knife edge.

Figure 2B:
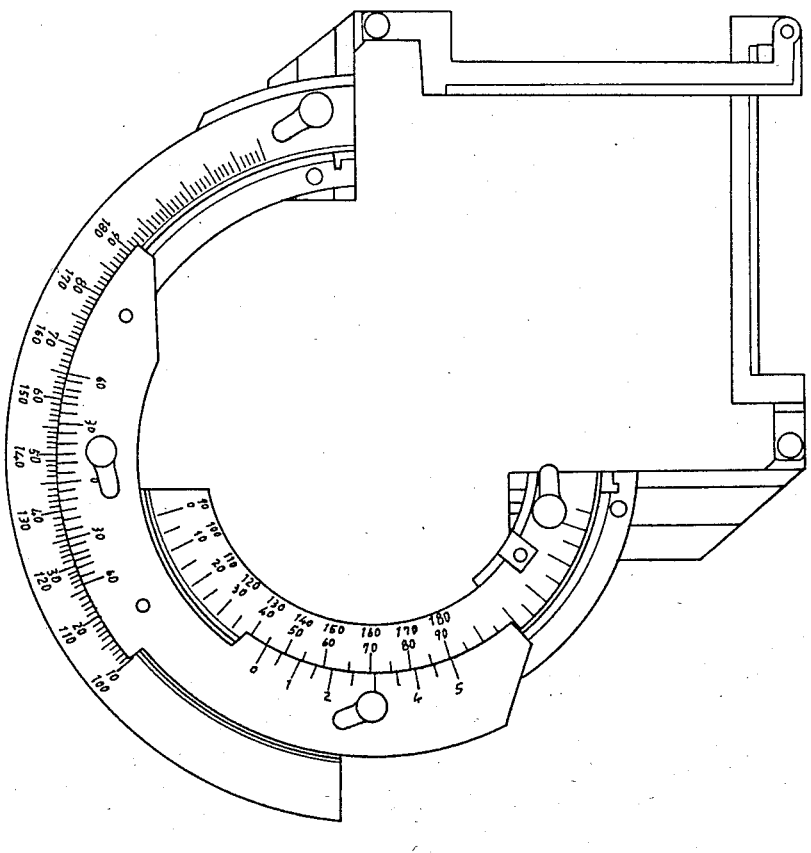
FIG. 2B is a top view showing a vernier gauge with its two measuring pieces in inverse positions with respect to FIG. 2A.
Figure 3A:
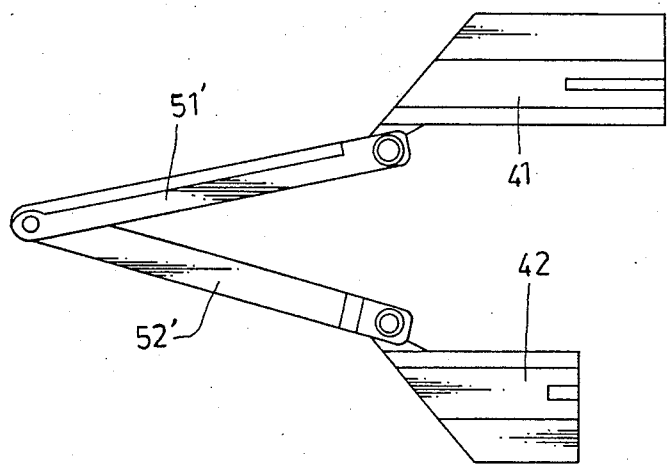
FIG. 3A is a top view showing how two straight pieces of a vernier gauge of the present invention interengage with each other and engage with two intermediates.
Figure 3C:
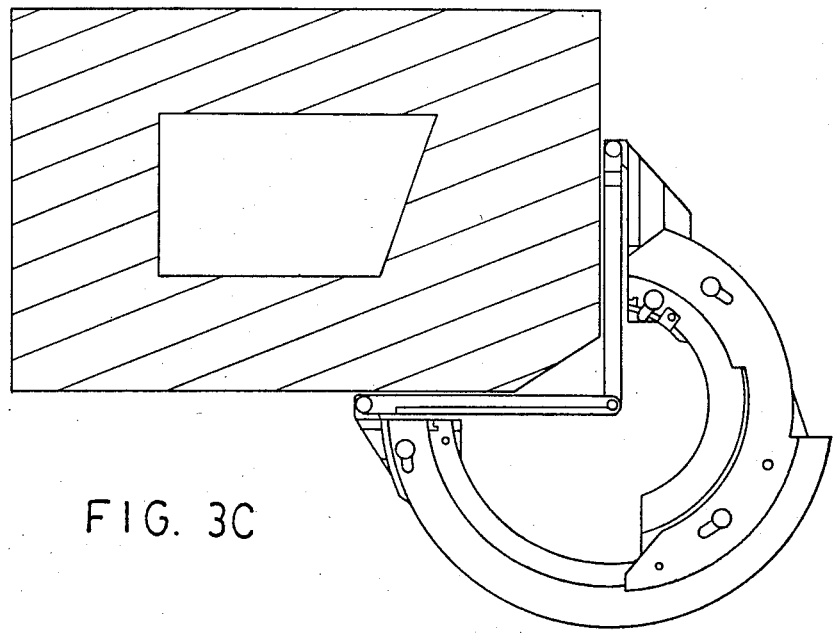
FIG. 3C shows a vernier gauge of the present invention with two straight measuring pieces in use.
Figure 3B:
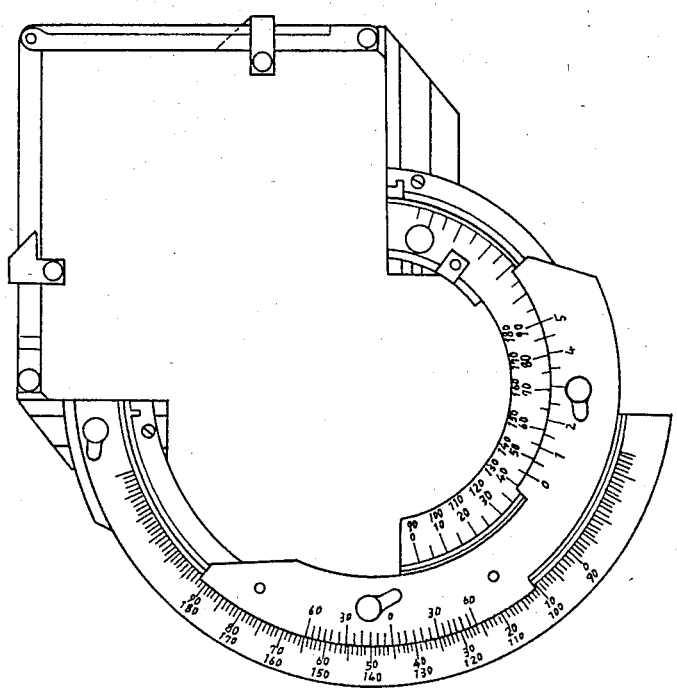
FIG. 3B is a top view showing a vernier gauge of the present invention with two straight measuring pieces.
Figure 3D:
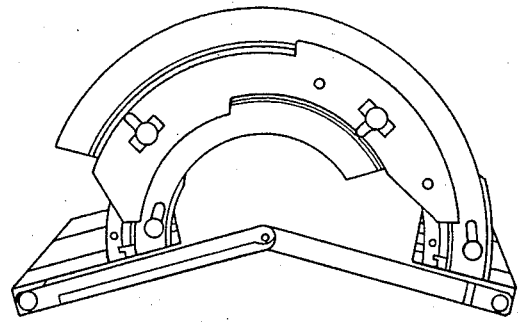
FIGS. 3D-3F show the two straight measuring pieces of a vernier gauge of the present invention in different stretching angles.
Figure 3E:
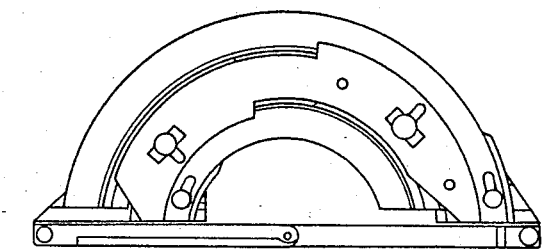
Figure 3F:
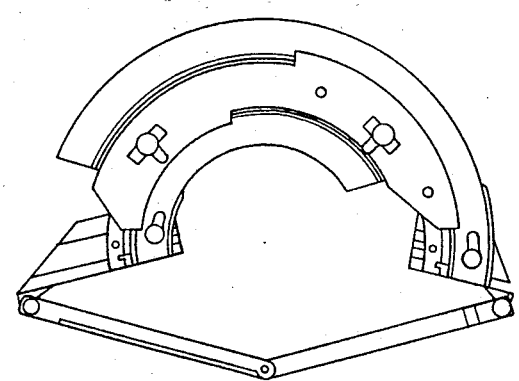

FIG. 2B shows a vernier gauge of the present invention with its two measuring pieces 51, 52 in inverse positions with respect to the gauge shown in FIG. 2A which also shows that two holes 11 can be provided on first arc member 10 for depositing therein magnifying glasses for clearly seeing the vernier scales on arc members and that a stopper 200 (300) can be provided on the upper surface of second (third) free end 21 (31) for marking the final positions which second (third) arc member 20 (30) can engage with first arc member 10 to prevent the disengagement between second (third) and first arc members 20 (30) & 10.

As shown in FIGS. 3A–3F, the measuring pieces of the above structure can successfully be substituted by two straight pieces 51', 52', the outer side of each of which, certainly, can also be shaped to simulate a knife edge for improving the accuracy in measuring.

Figure 4A:
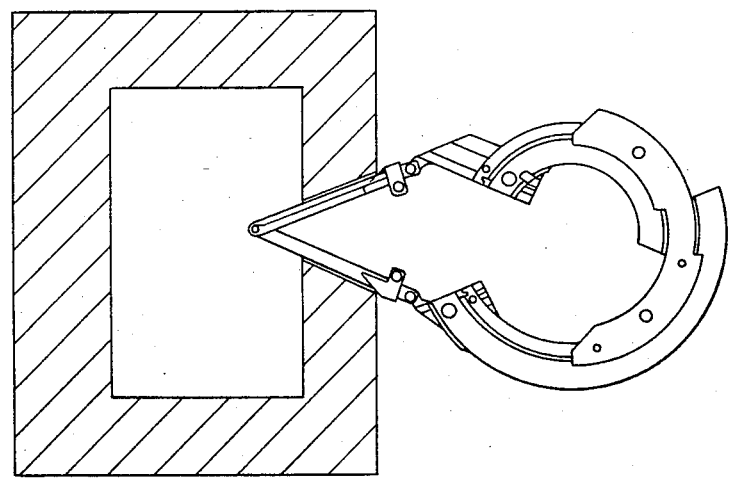
FIG. 4A shows a vernier gauge of the present invention with two straight measuring pieces in measuring the taper of a tapered bore.
Figure 4B:
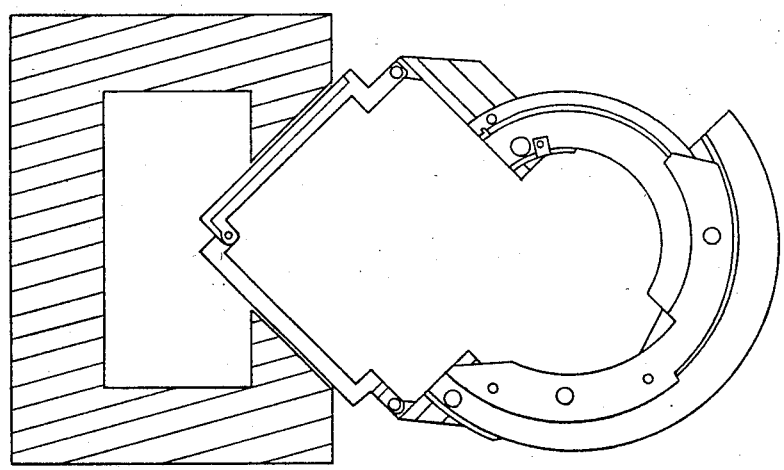
FIG. 4B shows a vernier gauge of the present invention with two measuring pieces shown in FIG. 1A in measuring the taper of a tapered bore.
Figure 5A:
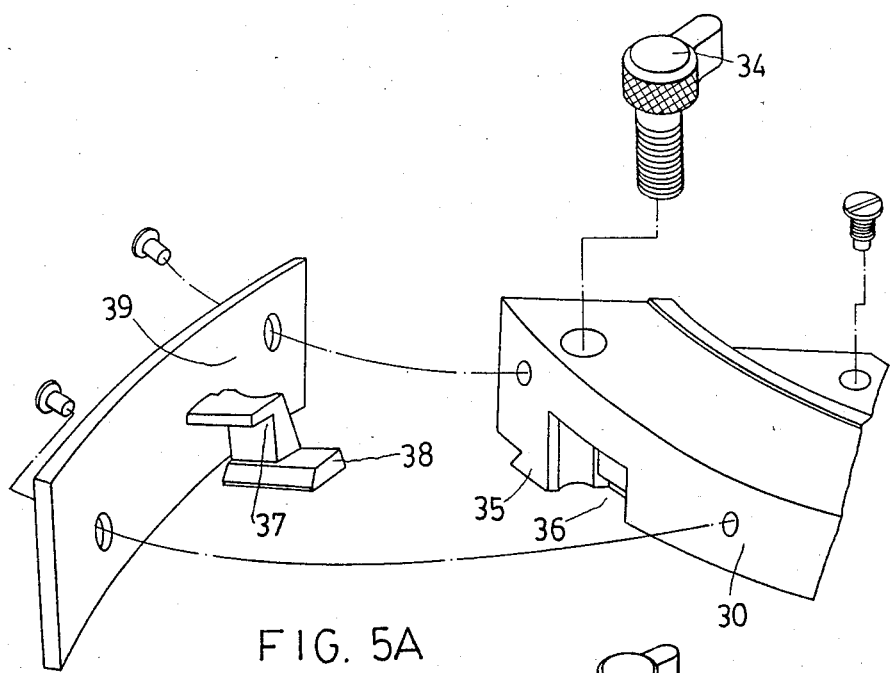
FIG. 5A is a perspective view showing one side of a securing piece of a vernier gauge of the present invention.
Figure 5B:
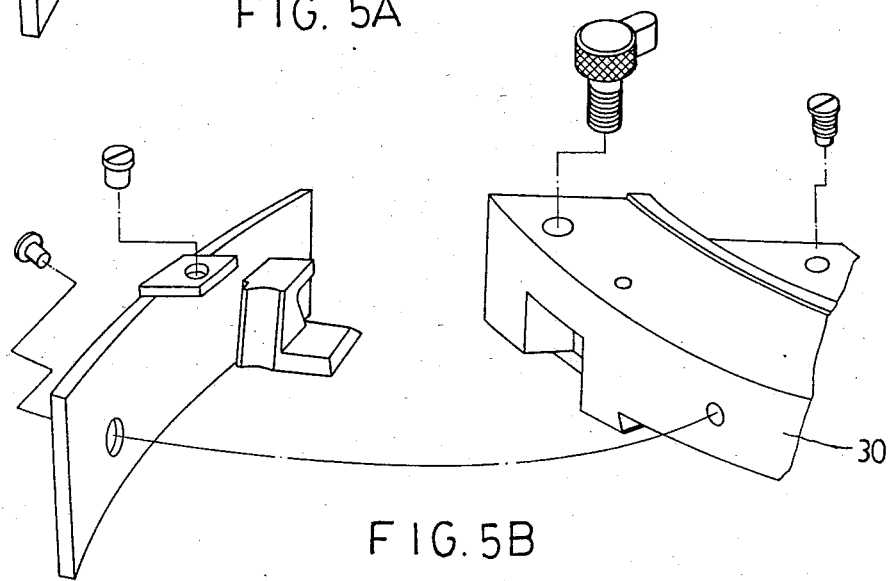
FIG. 5B is a perspective view showing the other side of the securing piece shown in FIG. 5A.
Figure 5C:
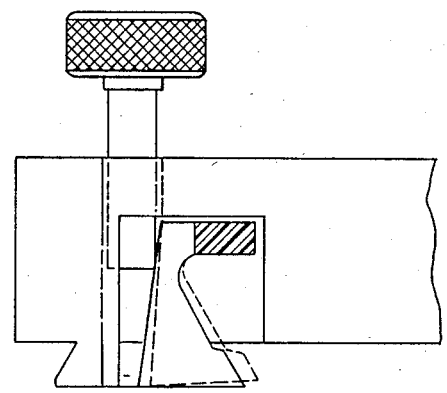
FIGS. 5C & 5D show how a securing piece cooperates with a first half dovetailed protrusion of a vernier gauge of the present invention.
Figure 5D:
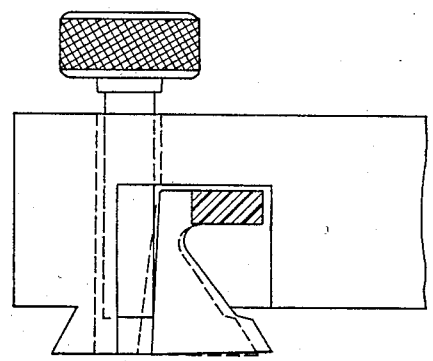
Figure 6:
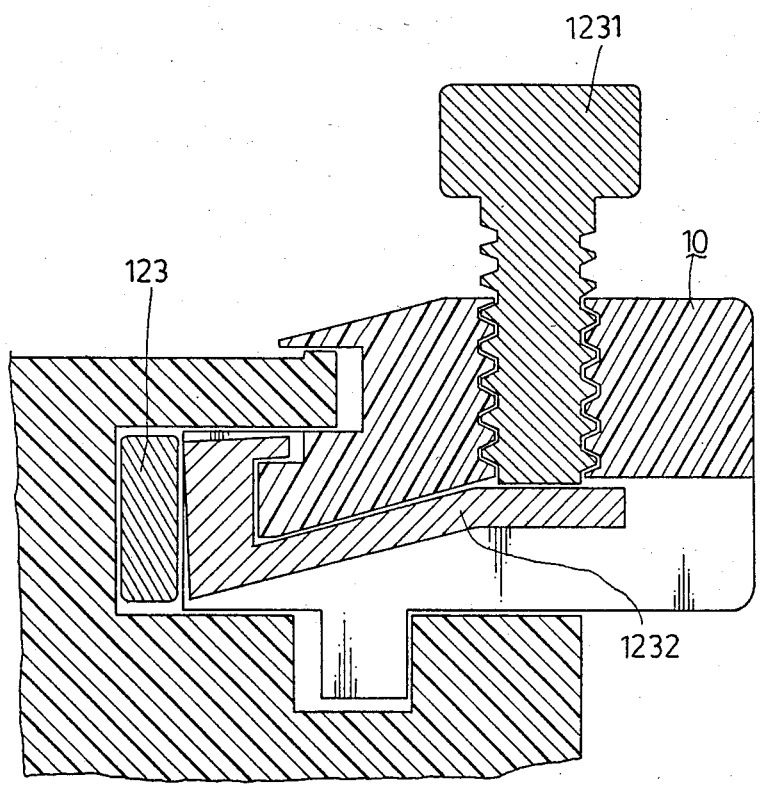
FIG. 6 shows how a lever piece will engage with a slip piece of a vernier gauge of the present invention.

FIG. 4A shows a vernier gauge with measuring pieces 51', 52' measuring the taper of a tapered bore and FIG. 4B shows a vernier gauge with measuring pieces 51, 52 measuring the taper of a tapered bore.

As shown in FIGS. 5A–5D, a screw 34 is provided for threadedly engaging with third (second) free end 31 (21), a first half dovetailed protrusion 35 is integrally formed with third (second) free end 31 (21) and third (second) free end 31 (21) is provided with a hole 36 adjacent to first half dovetailed protrusion 35 and capable of being protruded therein by screw 34. A securing piece 37 is capable of being received in hole 36 and has the lower end thereof formed thereon a second half dovetailed protrusion 38 which together with first half dovetailed protrusion 35 are capable of constituting a whole dovetailed protrusion. Screw 34 is capable of inserting between securing piece 37 and first half dovetailed protrusion 35 so that when screw 34 is screwed onto third (second) free end 31 (21) to a predetermined depth, the whole dovetailed protrusion will securely engage with a dovetailed groove 413 (423) (shown in FIG. 1A which also shows a deeper groove 4130 (4230) the length of which will indicate the degree intermediate 41 (42) should engage with free end 21 (31) to ensure a proper engagement therebetween) provided on intermediate 41 (42) to insure no relative movement therebetween. A retaining piece 39 is fixed to third (second) free end 31 (21) and is attached thereto securing piece 37 for retaining securing piece 37 in hole 36.

As has been mentioned in the parent application, a slip piece 123 can be provided between first and second arc members 10 & 20 or first and third arc members 10 & 30 for alleviating the friction of the sliding action between arc members. For locking the sliding action between arc members, the following procedure can be utilized. A lever piece 1232, which is fit in first arc member 10 and has a first end capable of engaging with slip piece 123 and a second end capable of engaging with a screw 1231 which threadedly engages with first arc member 10 so that when screw 1231 is screwed on first arc member 10 to urge the second end of lever piece 1232, the first end of lever piece 1232 will bias against slip piece 123 to insure no possibility of relative movement between the respective arc members, can be 7-shaped with the top portion thereof acting as the first end thereof and the lowest portion thereof acting as the second end thereof.

Figure 7A:
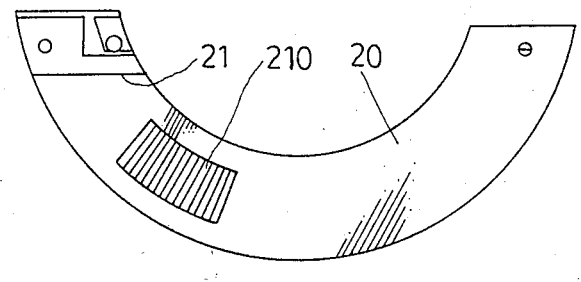
FIG. 7A shows a pushing piece provided on the bottom of a second arc member of a vernier gauge of the present invention.

FIG. 7A shows that the bottom of second (third) arc member 20 (30) near second (third) free end 21 (31) is attached thereto a pushing piece 210 for being possibly reached by the fingers of a user's one hand to enable the user to operate the present vernier gauge with only one hand.

Figure 7B:
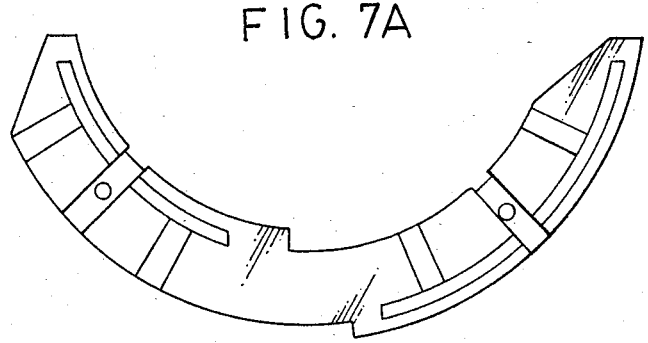
FIG. 7B is a bottom view of a first arc member of a vernier gauge of the present invention.

FIG. 7B shows the bottom view of first arc member 10.

Figure 7C:
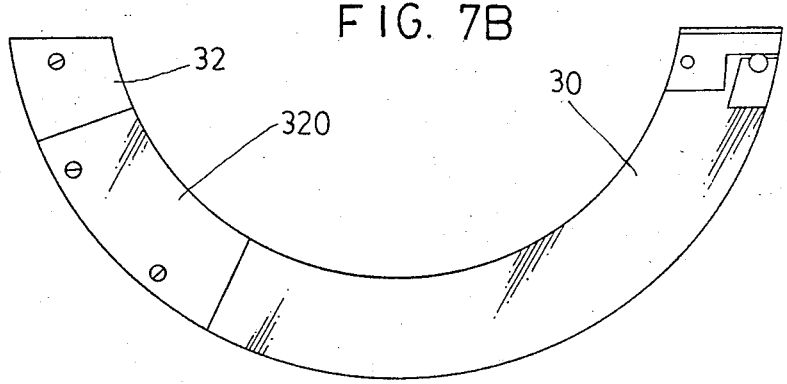
FIG. 7C shows a raising piece provided on a third arc member of a vernier gauge of the present invention.

FIG. 7C shows that the bottom of third (second) clamped end 32 (22) is provided with a raising piece 320 which has a height equal to that of intermediate 42 (41).

FIG. 8A shows a top view of arc members 10, 20 & 30 of a vernier gauge of the present invention.

FIG. 8B shows a side view of first and third arc members 10, 30 of a vernier gauge of the present invention attached with intermediate 42, measuring piece 52 and positioning piece 62.

While the present invention has been described in connection with what is presently considered to be the most practical and preferred embodiments, it is to be understood that the invention is not to be limited to the disclosed embodiments but on the contrary, is intended to cover various modifications and equivalent arrangements included within the spirit and scope of the appended claims which scope is to be accorded the broadest interpretation so as to encompass all such modifications and equivalent structures.

What I claim is:
1. A vernier gauge comprising:
   a first arc member having a first radially inner side and a first radially outer side;
   a second arc member having a second radially inner side and a second radially outer side slidably engaging with said first radially inner side, having a second free end and a second clamped end and provided with a second scale;
   a third arc member having a third radially inner side slidably engaging with said first outer side and a third radially outer side, having a third free end and a third clamped end and provided with a third scale, said third arc member together with said first and second arc members defining a free space at the center of said first, second and third arc members;
   two intermediates each of which has a first end provided on one of said second and third free ends and a second end and is capable of moving radially with respect to said arc members; and
   two measuring pieces each of which has a first engaging end pivotally connected to said second end and a second engaging end pivotally interconnected with each other whereby with said two measuring pieces contacting with two sides of an object to be measured, the angle stretched by said two sides can be read from said second and third scales.

2. A vernier gauge according to claim 1 wherein said measuring pieces are straight.

3. A vernier gauge according to claim 2 wherein the outer side of each of said measuring pieces is shaped to simulate a knife edge for improving the accuracy in measuring.

4. A vernier gauge according to claim 1 wherein each of said measuring pieces includes:
   a first portion having a first end forming thereon said first engaging end and a second end;
   a second portion having a first end connected and perpendicular to said second end of said first portion and a second end;
   a third portion having a first end connected and perpendicular to said second end of said second portion at a side on said second portion opposite to that where said first portion is connected and perpendicular to said first end of said second portion and a second end; and
   a fourth portion having a first end connected and perpendicular to said second end of said third portion and a second end forming thereon said second engaging end which positions at the extension of the centerline of said first portion.

5. A vernier gauge according to claim 4 wherein the outer side of each of said measuring pieces is shaped to simulate a knife edge for improving accuracy in measuring.

6. A vernier gauge according to claim 5, further comprising two positioning pieces each of which is capable of sliding along said third portion so that when said measuring pieces are fit in a tapered bore, said positioning pieces will respectively mark two points on said third portions so that a diameter of said tapered bore can be obtained by measuring the distance between said two points.

7. A vernier gauge according to claim 6 wherein each of said positioning pieces includes:
 a rectangular portion having a U-shaped cross section with the hollow portion thereof receiving therein said third portion for sliding thereon; and
 a triangular portion extended from one side of said rectangular portion and having a triangular shape with the outer side thereof shaped to simulate a knife edge.

8. A vernier gauge according to claim 1, further comprising:
 two slip pieces respectively provided between said first and second arc members as well as said first and third arc members;
 a screw threadedly engaging with said first arc member; and
 a lever piece fit in said first arc member and having a first end capable of engaging with one of said slip pieces and a second end capable of engaging with said screw so that when said screw is screwed on said first arc member to urge said second end of said lever piece, said first end of said lever piece will bias against said one slip piece to insure no possibility of relative movement between said two arc members provided with said one slip piece.

9. A vernier gauge according to claim 8 wherein said lever piece is 7-shaped with the top portion thereof acting as said first end thereof and the lowest portion thereof acting as said second end thereof.

10. A vernier gauge according to claim 1 further comprising two screws respectively threadedly engaging with said second and third free ends and wherein:
 each of said intermediates is provided with a dovetailed groove;
 two first half dovetailed protrusions respectively integrally formed with said second and third free ends;
 each of said second and third free ends is provided with a hole adjacent to said first half dovetailed protrusion and capable of being protruded therein by one of said screws; and
 two securing pieces each of which is received in said hole and has the lower end thereof formed thereon a second half dovetailed protrusion which together with one of said first half dovetailed protrusions are capable of constituting a whole dovetailed protrusion, said each securing piece and said first half dovetailed protrusion being capable of being inserted therebetween by said one screw which when screwed on one of said second and third free ends to predetermined depth will ensure that said whole dovetailed protrusion securely engages with said dovetailed groove to secure no relative movement therebetween.

11. A vernier gauge according to claim 10, further comprising two retaining pieces respectively fixed to said second and third free ends and to each of which said each securing piece is attached for being retained in said hole.

12. A vernier gauge according to claim 1, further comprising two stoppers respectively provided on the upper surfaces of said second and third free ends for marking the final positions which said second and third arc members can respectively engage with said first arc member to prevent the disengagement between said arc members.

13. A vernier gauge according to claim 1 wherein said second end of each of said intermediates is shaped triangularly and a protrusion is provided on the vertex thereon for engaging with said first engaging end of each of said measuring pieces.

14. A vernier gauge according to claim 10, further comprising two raising pieces respectively provided on the bottoms of said second and third clamped ends and having heights equal to those of said intermediates.

15. A vernier gauge according to claim 1, further comprising two pushing pieces respectively provided on the bottoms of said second and third arc members near said second and third free ends for being reached by the fingers of a user's one hand to enable that said user can operate said gauge with said one hand only.

* * * * *

UNITED STATES PATENT AND TRADEMARK OFFICE
CERTIFICATE OF CORRECTION

PATENT NO. : 4,596,075

DATED : June 24, 1986

INVENTOR(S) : Liu

It is certified that error appears in the above-identified patent and that said Letters Patent is hereby corrected as shown below:

Title page, Item [76] reading "Bau-Shen Liu; Bau-Horng Liu, both of Taipei, Taiwan" should read --Bao-Shen Liu, Taipei, Taiwan--.

Signed and Sealed this

Twenty-sixth Day of August 1986

[SEAL]

Attest:

DONALD J. QUIGG

Attesting Officer

Commissioner of Patents and Trademarks